United States Patent
Li et al.

(10) Patent No.: US 7,279,519 B2
(45) Date of Patent: Oct. 9, 2007

(54) COMPOSITION AND METHOD FOR TREATING TEXTILES

(75) Inventors: Tiandong Li, Singapore (SG);
Li-Cheun Koey, Singapore (SG);
Sigfredo Gonza'lez, Danbury, CT (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 10/805,924

(22) Filed: Mar. 22, 2004

(65) Prior Publication Data
US 2005/0209381 A1 Sep. 22, 2005

(51) Int. Cl.
*C08K 5/24* (2006.01)

(52) U.S. Cl. ................ 524/266; 524/320
(58) Field of Classification Search ............. 524/266, 524/320
See application file for complete search history.

(56) References Cited

U.S. PATENT DOCUMENTS

| | | | |
|---|---|---|---|
| 3,761,444 A | 9/1973 | Mendicino | |
| 4,826,618 A | 5/1989 | Borseth et al. | |
| 5,391,400 A | 2/1995 | Yang | |
| 5,593,611 A | 1/1997 | Czech | |
| 5,703,035 A | 12/1997 | Birkhan et al. | |
| 5,786,310 A | 7/1998 | Dubief et al. | |
| 5,807,956 A | 9/1998 | Czech | |
| 5,856,544 A | 1/1999 | Czech et al. | |
| 5,955,406 A | 9/1999 | Dubief et al. | |
| 5,977,189 A | 11/1999 | Keys | |
| 5,981,681 A | 11/1999 | Czech | |
| 6,013,711 A | 1/2000 | Lewis et al. | |
| 6,159,457 A | 12/2000 | Mougin | |
| 6,372,874 B1 | 4/2002 | Cameron | |
| 6,378,974 B1 | 4/2002 | Oelbrandt et al. | |
| 6,403,073 B1 | 6/2002 | Cauwet-Martin et al. | |
| 6,451,905 B2 | 9/2002 | Spyropoulos et al. | |
| 6,475,568 B1 | 11/2002 | Czech | |
| 6,500,784 B1 | 12/2002 | Mille et al. | |
| 6,521,683 B1 | 2/2003 | Simmons et al. | |
| 6,649,692 B2 | 11/2003 | Yu et al. | |

FOREIGN PATENT DOCUMENTS

| | | |
|---|---|---|
| CA | 2 422 903 | 3/2003 |
| DE | 198 17 776 A1 | 3/1968 |
| GB | 1 213 779 | 11/1970 |
| WO | WO 02/10259 A1 | 2/2002 |

OTHER PUBLICATIONS

JP 62280068, Publication Date Dec. 4, 1987 (abstract only).
DE19817776, Publication Date Oct. 28, 1999 (abstract only).

*Primary Examiner*—Edward J. Cain

(57) ABSTRACT

A composition comprising a silicone having at least one polyether functionality and at least one amino functionality, and an alkyl ether carboxylate of the general formula:

$$R^7O(C_2H_4O)_t(CH(CH_3)CH_2O)_qL_kCOOA$$

wherein $R^7$ is a monovalent hydrocarbon moiety of comprising about four to about 22 carbon atoms, t is 0 to about 20, q is 0 to about 10, L is a divalent hydrocarbon group of 1 to about 6 carbon atoms and k is 0 or 1, provided that the sum of t and q is greater than or equal to 1. There is also provided a method for treating a textile using the above composition, which method results in decreased silicone oil spotting, especially at elevated temperatures and pH.

22 Claims, No Drawings

COMPOSITION AND METHOD FOR TREATING TEXTILES

BACKGROUND OF THE INVENTION

The present invention relates to a textile processing composition and more particularly, to a composition and method for treating textiles using such composition in textile wet processing.

In the wet processing of textiles, oil spots often occur during finishing, resulting in defective goods. One type of oil spot is a silicone oil spot, which may arise from the separation of silicone softeners, for example, when such softeners are applied to or stripped off of a textile. For producers and processors of textiles this presents a problem that is not easily resolved. Many processes for treating textiles therefore have to account for, and merely accept a certain percentage of spotted products that may not be effectively marketed.

One solution has been an attempt to improve the emulsion stability of textile finishing compositions using non-ionic surfactants. This still has presented problems, in that under severe processing conditions, such as when the temperature of a textile finish emulsion is above the cloud point, the emulsion will lose its water solubility. The loss of water solubility may result in a greater degree of spotting in the textile. Furthermore, highly alkaline processing conditions also may contribute to a decrease in emulsion stability and an increase in spotting.

Therefore, a need exists for a composition and a method for treating textiles that will decrease the amount of spotting, specifically from silicone emulsions, while doing so under broadly varying processing conditions.

BRIEF DESCRIPTION

In one embodiment, a composition comprises
(a) a polysiloxane comprising at least one amino group and at least one polyether group; and
(b) an polyglycol ether carboxylic acid/salt of the general formula (5):

wherein A is hydrogen or a cation, $R^{11}$ is a monovalent hydrocarbon group of about 4 to about 22 carbon atoms, t is 0 to about 20, q is 0 to about 10, L is a divalent hydrocarbon group of 1 to about 6 carbon atoms, and k is 0 or 1, provided that the sum of t and q is greater than or equal to 1.

In one embodiment, the composition is in the form of a concentrate.

In another embodiment, the composition is in the form of an aqueous emulsion.

There is further provided a method comprising treating a textile with the above-described compositions.

DETAILED DESCRIPTION OF THE INVENTION

It has been found by the inventors hereof that emulsions of certain polysiloxane copolymers may be stabilized by use of an polyglycol ether carboxylic acid/salt as described above, thereby overcoming oil separation. In a particularly advantageous feature, it has been found that use of such stabilized emulsions may ameliorate or prevent oil separation under severe treatment conditions, for example at high temperatures and/or at pH extremes, and especially at high temperatures and at high pH. Without being bound by theory, it is believed that the presence of the carboxylic groups contributes to the efficacy and advantageous features of the compositions. At relatively low pH, the majority of the carboxylic acid groups of the polyglycol ether carboxylic acid/salt are protonated, yielding a non-ionic surfactant that promotes emulsification of the polysiloxane copolymer at low pH. At neutral or high pH, more carboxylic acid groups are in the anionic or salt form, yielding an anionic surfactant that promotes emulsification of the polysiloxane under neutral or alkaline conditions.

The polyglycol ether carboxylic acid/salt is most effective when used in combination with a polysiloxane copolymer comprising an amino group and a polyether group. One suitable linear polysiloxane copolymer comprises a polysiloxane unit of general formula (1)

a polyalkyleneoxide unit of general formula (2)

and a linking group of formula $-NR^3-$, $(-NHR^3-)^+(P^-)$ or $(-NR_2^3-)^+(P^-)$.

In formula (1), each $R^1$ is independently a divalent hydrocarbon group with at least one carbon, which may have hydroxy substitutions thereon and/or include an ether linkage. Preferably, $R^1$ contains less than ten carbon atoms.

Each $R^2$ in formula (1) is independently phenyl, or an alkyl or perfluoroalkyl group having 1 to about 6 carbon atoms, i.e., methyl, ethyl, propyl, butyl, and isomers of the foregoing, e.g., isopropyl, t-butyl, and the like. In one embodiment, $R^2$ is methyl.

Further in formula (1), f is an integer of 1 to about 500. In one embodiment, f is about 200 to about 300.

Each X and Y in formulas (1) and (2) respectively is a divalent organic linking group derived from the ring opening of an epoxide. The ring-opened epoxides may be aliphatic, cycloaliphatic, and may contain aromatic rings. They also contain hydroxy groups and/or an ether linkage. Exemplary ring-opened epoxides include $-CH_2CH(OH)(CH_2)_v CH(OH)CH_2-$, $-CH[CH_2OH](CH_2)_v CH[CH_2OH]-$, $-CH_2CH(OH)(CH_2)_v CH[CH_2OH]-$, $-(CH_2)_v-$, $-OCH_2CH(OH)CH_2-$, or $-(CH_2)_v OCH_2CH(CH_2[OH])-$, wherein v=2 to 6. Alternatively, the ring-opened epoxides may be derived from epoxycyclohexyl alkylene groups such as ω-(3,4-epoxycyclohexyl)alkylene, β-(3,4-epoxycyclohexyl)ethylene, β-(3,4-epoxycyclohexyl)-β-methylethylene, or β(3,4-epoxy-4-methylcyclohexyl)-β-methylethylene.

$R^3$ in the linking groups is an alkyl, aryl or aralkyl group, oxygen-containing alkyl, oxygen-containing aryl, or oxygen-containing aralkyl, each having 1 to about 22 carbon atoms. Exemplary $R^3$ groups include, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, methoxy, ethoxy, propoxy, butoxy, phenyl, biphenyl, naphthyl, tolyl, xylyl, anthracyl, methoxyphenyl, isomers of the foregoing, and the like. P in the linking groups is an anion.

Further in formula (2), d is about 2 to about 4, and e is 2 to about 100, and may also be about 3 to about 50. The polyoxyalkylene blocks in formula (2) may be made up of ethylene oxide (d=2), propylene oxide (d=3), and/or butylene oxide (d=4) in a random or block fashion. The ratio among such oxides may be adjusted as required for the desired solubility parameters of the resulting copolymer.

The copolymer is preferably end-capped with secondary amino groups —NHR$^3$, tertiary amino groups —NR$_2^3$, or quatemized amino groups —NR$_2^3$)$^+$(P$^-$), wherein each R$^3$ is the same or different R$^3$ group as described above.

The number of units per molecule of copolymer is limited by the ability to handle high viscosity material, since the viscosity is directly proportional to the number of units of copolymer, but practically there should be at least two of each unit and may be up to 1,000 units. It is preferred that the terminal groups of the copolymer be amino groups, as noted above. The molecular weight of the copolymer may be modified by varying the molar ratio of the epoxy component to amino component, by varying the number of oxyalkylene units and the number of siloxy groups within the polysiloxane blocks.

Methods for the manufacture of the foregoing polysiloxane copolymer are known, being described, for example, in U.S. Pat. No. 6,475,568, which is incorporated herein by reference in its entirety. As described therein, reaction of polysiloxanes of the formula QR$^1$[(SiO(R$^2$)$_2$]$_x$Si(R$^2$)$_2$R$^1$Q, with polyalkyleneoxides [ZO(C$_b$H$_{2b}$O)$_d$Z], wherein Q and Z are epoxide containing groups, with a primary amine or a combination of primary and secondary amines, where the secondary amine will function as a chain stopper. These species may be manufactured by means known in the art or are commercially available.

In an exemplary process, therein, α,ω-hydrogenpolysiloxanes of the general formula H(SiO(R$^2$)$_2$)$_x$Si(R$^2$)$_2$H are reacted in a first step with the unsaturated epoxides with a terminal olefinic bond, such as allyl glycidyl ether, in the presence of a hydrosilation catalyst, such as hexachloroplatinic acid, at elevated temperature, to produce epoxy end-blocked polysiloxanes. Such procedures are known in the art as indicated in U.S. Pat. No. 3,761,444 and U.K. Patent No. 1,213,779.

In a second step, also detailed in U.S. Pat. No. 6,475,568, the epoxy end-blocked polysiloxanes and epoxy end-blocked polyalkyleneoxides are reacted with primary amino groups or a combination of primary and secondary amino groups. Suitable epoxy end-blocked polyalkyleneoxides are represented, for example, by DER 732 and DER 736 available from Dow Chemical Co. The primary amines may be, for example, ethylamine, propylamine, butylamine, isobutylamine, hexylamine, cyclohexylamine, benzylamine, ethanolamine, propanolamine, and the like, and the secondary amines may be, for example, diethylamine, dipropylamine, dibutylamine, diisobutylamine, dihexylamine, dicyclohexylamine, dibenzylamine, diethanolamine, dipropanolamine, and the like. The reaction is carried out in a suitable solvent, such as an alcohol or a mixture of alcohol and water at reflux. If the boiling point of the amine is lower than the boiling point of the solvent, the reaction is conducted in a pressurized vessel.

After the above referenced reaction in U.S. Pat. No. 6,475,568, the solution of the copolymer may be neutralized, as described therein, by a direct addition of a Brönsted acid, such as acetic acid, citric acid, tartaric acid, or fatty acids, such as stearic or isostearic acid, to form an ammonium salt and the product is isolated by distilling off the solvent at atmospheric or reduced pressure. It is also possible to isolate un-neutralized copolymer and then proceed with neutralization as described above or quaternization of the amino groups.

As described in U.S. Pat. No. 6,475,568 the quaternization reaction of the amines typically involves common alkylating agents, such as alkyl halides or sulfates, and the resulting quaternium salt may offer improved deposition properties or static electricity control as compared to the starting amines or their salts. An alternate way to produce quaternized structures is to react the epoxy end-blocked polysiloxanes and epoxy end-blocked polyalkyleneoxides with secondary amines selected from, for example, diethylamine, dipropylamine, dibutylamine, diisobutylamine, dihexylamine, dicyclohexylamine, dibenzylamine, dipropanolamine, and the like in the presence of a stoichiometric amount of a Brönsted acid, such as hydrochloric acid, sulfuric acid or acetic acid. The reaction is carried out in a suitable solvent, such as an alcohol or a mixture of alcohol and water at reflux.

In another embodiment, the polyglycol ether carboxylic acid/salt provides increased emulsion stability and/or a decrease in spotting when used in combination with a polysiloxane copolymer wherein the amino group and/or the polyether group are pendant, in accordance with formula (3):

$$RSiR^2_2O[Si(R^2_2)O]_x[Si(R^2)(Z)O]_ySiR^2_2R \qquad (3).$$

In formula (3), x is 1 to about 500. In one embodiment, x is 40 to about 250. Further, y is 1 to about 50, and may also be about 3 to about 25. The ratio of x:y may be adjusted as required for the desired solubility parameters of the resulting copolymer.

Each R$^2$ in formula (3) is independently phenyl or an alkyl or perfluoroalkyl group of 1 to about 6 carbon atoms as described above. In one embodiment, each R$^2$ is independently phenyl or methyl. In another embodiment, each R$^2$ is methyl.

Each R in formula (3) may be the same or different, and may be an alkyl group of 1 to about 4 carbon atoms or Z.

Z may be a group of the general formula (4)

$$—BO(C_dH_{2d}O)_mG \qquad (4)$$

wherein d is about 2 to about 4 and m is about 3 to about 100, and may also be about 3 to about 50. The polyoxyalkylene blocks (C$_d$H$_{2d}$O) may be made up of ethylene oxide (d=2), propylene oxide (d=3), and/or butylene oxide (d=4) in a random or block fashion. The ratio among such oxides may be adjusted as required for the desired solubility parameters of the resulting copolymer. In one embodiment, ethylene oxide blocks are present. In another embodiment, a mixture of ethylene oxide and 2-propylene oxide blocks are present.

B in group Z of formula (4) is an alkylene group of about 2 to about 4 carbon atoms.

G in group Z of formula (4) is a hydrogen atom or a lower alkyl group of 1 to about 4 carbon atoms.

Z may also be D, which is an amino group of the formula —R$^4$M, —R$^4$N(R$^5$)$_2$, or —R$^4$N(R$^5$)—R$^6$—N(R$^5$)$_2$.

R$^4$ in group D is an alkylene group of 1 to about 10 carbon atoms optionally containing a hydroxy group and/or an ether linkage. In one embodiment, R$^4$ is —CH$_2$CH(OH)(CH$_2$)$_v$CH(OH)CH$_2$—, —CH[CH$_2$OH](CH$_2$)$_v$CH[CH$_2$OH]—, —CH$_2$CH(OH)(CH$_2$)$_v$CH[CH$_2$OH]—, —(CH$_2$)$_v$—OCH$_2$CH(OH)CH$_2$—, or —(CH$_2$)$_v$OCH$_2$CH(CH$_2$[OH])—, wherein v=2 to 6. In another embodiment, R$^4$ is —CH$_2$CH$_2$CH$_2$OCH$_2$CH(OH)CH$_2$—.

M in group D is a heterocyclic amine comprising about 4 to about 6 carbon atoms, optionally with one oxygen atom in the ring, and optionally substituted with a C$_{1-2}$ alkyl group or a C$_{1-4}$ alkoxy group. Exemplary heterocyclic amines include morpholinyl, piperizinyl, and hydroxyethyl piperazinyl. In one embodiment, R$^4$ is —CH$_2$CH$_2$CH$_2$OCH$_2$CH(OH)CH$_2$—and M is morpholinyl.

Each R$^5$ in D is independently a hydrogen atom, an alkyl group of 1 to about 6 carbon atoms, a hydroxyalkyl group of 1 to about 6 carbon atoms, or —R⁴M as defined above. In one embodiment, each $R^5$ is independently —CH₂CH₂OH.

Each $R^6$ in D is independently an alkylene group of 1 to about 6 carbon atoms or a hydroxyalkylene group of 1 to about 6 carbon atoms, each of which may contain an ether linkage.

In an important feature of formula (3), at least one Z is a polyether and at least one Z comprises an amino group. Thus, where y is one, at least one R group must be Z.

The molecular weight of the copolymers may be modified by varying the molar ratio and number of repeating units of x to y, and by varying the number of oxyalkylene units and the number of siloxy groups within the polysiloxane blocks. Methods for the manufacture of the foregoing polysiloxane copolymers are known, and described, for example above, in U.S. Pat. No. 6,451,905, and in WO 02/10259.

Other polysiloxane copolymers comprising at least one amino group and at least one ether group may be used instead of, or in combination with the above-described polysiloxane copolymers. Other suitable polysiloxane copolymers comprising at least one amino group and at least one ether group are described, for example, in U.S. Pat. Nos. 5,807,956, 5,981,681, and DE 19817776. Other silicones known for use in fabric treatment may be present in small amounts, provided that they do not adversely affect the composition.

It is to be understood that the term "carboxylic acid/salt" as used herein is inclusive of all forms of the carboxylic acid group, including protonated, anionic, and salt forms, regardless of the actual form(s) used to prepare the composition or the form(s) present in the composition during use. The polyglycol ether carboxylic acid/salt has the following formula (5):

$$R^7O(C_2H_4O)_t(CH(CH_3)CH_2O)_qL_kCOOA \qquad (5).$$

$R^7$ in structure (5) is a monovalent hydrocarbon group of about 4 to about 22 carbon atoms. In one embodiment, $R^7$ is a straight chain or branched alkyl group, aralkyl group, or alkaryl group of 4 to about 18 carbon atoms. In a preferred embodiment, $R^7$ has about 8 to about 16 carbon atoms.

L in formula (5) is a divalent hydrocarbon group of 1 to about 6 carbon atoms, for example a saturated or unsaturated, straight, cyclic or branched chain aliphatic, alkaryl, or aralkyl group. k is 0 or one.

Further in formula (5), t is 0 to about 20 and q is 0 to about 10, provided that the sum of t and q is greater than or equal to 1.

A in structure (5) is hydrogen or a cation. Suitable cations include, for example, ammonium ions, alkaline metal cations, alkaline earth metal cations, and the protonated forms of amines having the structure $NH_2R^8$, $NH(R^8)_2$, or $N(R^8)_3$ wherein each $R^8$ is hydrogen or a straight or branched chain alkyl group comprising one to about eight carbon atoms, which may be optionally modified with a hydroxyl group, or a mixture comprising at least one of the foregoing cations. In one embodiment $R^8$ is —CH₂(CH₂)$_w$CH₃, wherein w is zero to about six, and containing an optional hydroxy group. In one embodiment, A is $K^+$, $Na^+$, and/or the protonated form of monoethanolamine, triethanolamine, and/or triethylamine.

In use, the weight ratio of the polysiloxane copolymer to polyglycol ether carboxylic acid/salt is a ratio effective to stabilize an emulsion of the polysiloxane copolymer. The emulsion may be a microemulsion or a macroemulsion (milky emulsion). In one embodiment, the weight ratio is effective to stabilize the emulsion at up to about 100° C. and a pH of about 2 to about 12. An exemplary suitable weight ratio of polysiloxane copolymer to polyglycol ether carboxylic acid/salt is about 99:1 to about 1:20. In one embodiment, the weight ratio is about 99:1 to about 1:1, more specifically, about 99:1 to about 80:20. In another embodiment, the weight ratio may be about 97:3 to about 90:10.

In a further exemplary embodiment, such compositions may further comprise low molecular weight carboxylic acids having 2 to about 6 carbon atoms as additional emulsion stabilizers. Examples of such carboxylic acids include glycolic acid, citric acid, itaconic acid, ascorbic acid, and the like. The amount of carboxylic acid is generally based on the moles of amine groups in the copolymers. In one embodiment, the mole ratio of acid groups to amino groups is about 1:5 to about 5:1, and more specifically about 1:2, to about 2:1. An approximately equimolar amount of acid groups to amino groups can also be used.

Other materials typically employed in the treatment of textile fiber and fabric substrates may be incorporated in the composition in the usual amounts. Such materials include durable press resins, curing catalysts, preservatives, biocides, water soluble pigments or dyes, fragrances, fillers, pH adjusters, antifoamers, defoamers, and the like.

Additional emulsifiers may be used in addition to the polyglycol ether carboxylic acid/salt of the general formula (5). Suitable additional emulsifiers include, for example, linear or branched ethers of polyglycerol, alkoxylated glyceryl esters, alkoxylated alcohols, i.e., ethers formed from the reaction of an aliphatic, aromatic, or heterocyclic alcohol with an alkylene oxide, generally ethylene or propylene oxide. Preferably, the alcohol is an aliphatic alcohol, more preferably a fatty alcohol having 10-22 carbon atoms, and 1 to 200 repeating ethylene oxide units are present. Polyethylene glycol (PEG) derivatives of fatty acids may also be used. Other types of emulsifiers may also be used. Exemplary emulsifiers include polyglyceryl-3 distearate, polyethylene glycol ethers, polyethylene glycol monooleate, polyethylene glycol dioleate, polyethylene glycol dilaurate, polyethylene glycol distearate, polyethylene glycol stearate, polyethylene glycol isostearate, sorbitan monostearate, sorbitan sesquioleate, diethylene glycol monobutyl ether, butyl carbitol, polyethylene tridecyl ether, butoxy triglycol, and the like, as well as combinations comprising one or more of the foregoing emulsifiers. Suitable amounts of co-emulsifier are readily determined by one of ordinary skill in the art without undue experimentation. In one embodiment, a suitable weight ratio of polysiloxane copolymer to co-emulsifier is about 100:0.01 to about 1:10, more specifically about 100:0.1 to about 1:1, and still more specifically about 99:1 to about 80:20.

The above-described composition enables the silicone oil emulsions to be applied or stripped off from a textile fiber, yarn or fabric at a wide rage of pH and temperature conditions, as well as under conditions of high shearing. It further enables textile mills to over-dye and re-dye textiles that have been treated with silicone. Examples of textiles that may be treated with the above-described composition may be fiber, fabric or yarn, as well as other commercially known textiles.

In one embodiment, an aqueous emulsion-forming concentrate of the silicone and the polyglycol ether carboxylic acid/salt in accordance with the present invention may be prepared by high shear mixing or agitation of a mixture of the silicone and the polyglycol ether carboxylic acid/salt, optional co-emulsifiers and other optional ingredients as is well known in the art. Thus, the concentrates may be prepared by mixing with a suitable stirrer such as a homomixer or homogenizer. The composition, with or without an emulsion-forming amount of water (the former when the direct production of a finished or semi-finished emulsion is desired, the latter when a concentrate is desired) are introduced into a suitably equipped vessel. The length of time the mixture is mixed/agitated depends on the balance of the polarity between, or the hydrophilicity of, the silicone and the polyglycol ether carboxylic acid/salt and optional component(s). The concentrate and emulsions formed therefrom exhibit excellent stability during storage, when diluted and when subjected to mechanical shearing.

The amount of water used to provide an aqueous emulsion is not critical and may vary considerably depending on the nature and amounts of the components constituting a particular composition. In general, an amount of water may be utilized that results in an oil-in-water or water-in-oil type aqueous emulsion of good stability (i.e., no apparent phase separation), e.g., stability for at least about 1, and preferably at least about 7, days following storage at 55° C. The amount of water in most cases may be about 20 to about 2000 parts, or about 100 to about 500, parts by weight per 100 parts by weight of the total amount of siloxane. It may be economically beneficial to prepare an emulsion with a high siloxane content, i.e., a semi-finished emulsion, in order to reduce shipping and/or handling costs and thereafter to dilute the emulsion on site with additional water to desired application strength prior to use.

Alternatively, the polyglycol ether carboxylic acid/salt may be added to textile-treating solutions. Thus, the polyglycol ether carboxylic acid/salt may be added to the textile treating solution during the preparation of the emulsion or after the preparation of the emulsion.

Treatment methods using the composition herein may involve any known or commercially available methods of textile treatment, for example wet textile processing. Many textile manufacturing operations such as yarn slashing, dyeing, printing, and finishing of fabrics use wet processing techniques. These techniques involve using an aqueous solution or bath to apply chemicals to a textile substrate, fixing the chemicals to the fiber, scouring or washing to remove loose chemicals and drying to produce a finished fabric or garment. Thus, in one exemplary embodiment of the invention, treatment of the textile comprises contacting the textile with a textile treating solution comprising the above-described polyglycol ether carboxylic acid/salt and silicone composition in the form of an emulsion. The emulsion may be applied to a textile fiber or fabric substrate by such known and conventional techniques as spraying, dipping, padding, kiss roll, and the like. Such operations may be followed by the removal of excess liquid employing any suitable means, e.g., a mangle, centrifugal separator, and the like, to control the amount of liquid taken up by the substrate followed by drying the treated substrate with or without the application of heat. When drying is accomplished by heating the substrate, the temperature may be about 70° to about 180° C. for from about 1 to about 30 minutes. The amount of the aqueous emulsion applied to the textile fiber or fabric substrate will generally be such as to deposit from about 0.1 to about 5 percent by weight of silicone by weight of substrate.

The present compositions may be used for the treatment of many kinds of textile fiber and fabric substrates including polyester, acrylic, nylon, aramid, and the like, as well as various types of natural fibers such as cotton, silk, wool, and the like. The forms of the substrates are not limited and include filaments, rovings, threads, woven and non-woven fabrics, knit cloths, and the like. The compositions may also be applied to inorganic fibers such as glass fibers, carbon fibers, and the like.

In a particularly advantageous feature, one embodiment of a method for treating textiles comprises treating a textile with the above-described composition at temperatures of ambient temperature to up to about 100° C., and at a pH of about 2 to about 12. The pH may also be about 3 to about 10, about 4 to about 8, or about 5 to about 7. The treatment temperature may also be up to about 80° C., up to about 60° C., or up to about 40° C. In another embodiment, the treatment temperature is up to about 100° C., and the pH is about 8 to about to about 12, about 9 to about 11, or about 10 to about 12.

In an exemplary embodiment, the textile that is treated with the above-described polyglycol ether carboxylic acid/salt and silicone composition will have a degree of spotting that is lower than if the textile had not been treated with the polyglycol ether carboxylic acid/salt and silicone composition. This may provide for a broader and thus more advantageous use of textile finishes such as silicone softeners with a reduced degree of spotting. For example, the polyglycol ether carboxylic acid/salt of formula (5) provides increased emulsion stability and/or a decrease in spotting when used in combination with a polysiloxane copolymer of formula (1). In addition, the polyglycol ether carboxylic acid/salt of formula (5) provides increased emulsion stability and/or a decrease in spotting when used in combination with a polysiloxane copolymer of formula (3).

The compounds disclosed herein are described using standard nomenclature. A dash ("-") that is not between two letters or symbols is used to indicate a point of attachment for a substituent. A "hydrocarbon group" as used herein means a group comprising at least carbon and hydrogen, optionally together with heteroatoms such as nitrogen, oxygen, and/or sulfur. Hydrocarbyl groups may contain one or more other suitable substituents, for example alkoxy, nitro, hydroxy, amino, and the like. All technical terms have the same meaning as is commonly understood by one of skill in the art to which this invention belongs, unless specifically defined otherwise.

The following examples are merely illustrative of the invention and are not intended to be limiting in any manner.

EXAMPLE 1

Preparation of an Emulsion Containing Silicone Copolymer 1 (Sample-1).

Silicone copolymer 1 is a block, non-$(AB)_n$ silicone polyalkyleneoxide copolymer with tertiary amino links, produced in accordance with U.S. Pat. No. 6,475,568. Sample-1 is produced by charging 70 parts of silicone copolymer 1 and 14 parts of polyoxyethylene tridecyl ether (10 EO) into a beaker and agitating the mixture for 15 minutes (min) at 500 rotations per minute (rpm). Next, 10 parts of butyl carbitol or butoxy triglycol are charged into the mixture under continuous stirring, and the contents are stirred for 15 min. Six parts of water are slowly charged into this mixture and stirring is continued for an additional 15 min to produce Sample-1.

EXAMPLE 2

Preparation of an Emulsion Containing Silicone Copolymer 2

Silicone copolymer 2 is a linear polyquaternary-polysiloxane-polyalkyleneoxide copolymer produced in accordance with WO 02/10259. The emulsion containing silicone copolymer 2 is produced by charging 70 parts of copolymer 2 and 14 parts of polyoxyethylene tridecyl ether (10 EO) into a beaker and agitating the mixture for 15 min at 500 rpm.

Next, 10 parts of butyl carbitol or butoxy triglycol are charged into the mixture under continuous stirring and are stirred for 15 min. Six parts of water are then slowly charged into this mixture and stirring is continued for an additional 15 min to produce the emulsion containing silicone copolymer 2.

EXAMPLE 3

Preparation of Emulsion Containing Silicone Copolymer 1 and a Polyglycol Ether Carboxylic Acid/Salt (Sample-2)

An emulsion containing silicone copolymer 1 and the polyglycol ether carboxylic acid/salt, (Sample-2) is produced by charging 96 parts of the emulsion prepared in Example 1 into a beaker and stirring the mixture at 500 rpm. Next, 4 parts of a polyglycol ether carboxylic acid/salt having $C_{9-14}$ alkyl ether and comprising ethylene oxide groups, available under the trade name Emulsogen COL-080 from Clariant, is slowly charged into the beaker and stirring is continued for 15 min to produce the emulsion containing the silicone copolymer 1 and the polyglycol ether carboxylic acid/salt (Sample-2).

EXAMPLE 4

Preparation of an Emulsion Containing Silicone Copolymer 2 and a Polyglycol Ether Carboxylic Acid/Salt An emulsion containing silicone copolymer 2 and a polyglycol ether carboxylic acid/salt is produced by charging 67.2 parts of copolymer 2 and 13.4 parts of polyethylene tridecyl ether (10 EO) into a beaker. The mixture is agitated at 500 rpm for 15 minutes. Next, 9.6 parts of butoxytriglycol was charged, followed by 5.8 parts of water and 4 parts of Emulsogen COL-080. These additions are done under continuous mixing to produce the emulsion containing the silicone copolymer 2 and the polyglycol ether carboxylic acid/salt.

EXAMPLE 5

Fabric Treatment and Evaluation

Two pieces of 100% cotton woven fabric were treated with 10 grams per liter (g/liter) of Sample-1 (Example 1) and 10 g/liter of Sample-2 (Example 3), respectively. The fabric pieces were dried at 170° C. for one minute and were left at ambient temperature overnight. The above-treated fabrics were then dipped into a stripping solution containing 2 grams (g) of NaOH/liter and 1.5 g of sodium dodecylbenzene sulfonate (30%). The solution was heated to a boil and maintained at a boil for 60 min. The stripping solution containing the fabric treated with Sample-1 showed oil droplets on the surface, along with some white precipitate on the bottom. The droplets were transferred to the fabric after cooling, which indicated that they had a potential to cause spotting. In comparison, the stripping solution containing the fabric treated with Sample-2 did not develop oil droplets on the surface. In addition, no white solid or precipitate was found. Table 1 below provides a summary of the results obtained using Sample-1, which has no polyglycol ether carboxylic acid/salt, with Sample-2, which contains the polyglycol ether carboxylic acid/salt.

TABLE 1

| pH | Temperature, ° C. | Sample-1* 1% aqueous emulsion | Sample-2 1% aqueous emulsion |
|---|---|---|---|
| 11–12 | 25° C. | Oil separation occurred on the surface in addition to some precipitation | Translucent mixture with no oil spots |
|  | Heating from 25° C. to 100° C. | Oil separation occurred at 60° C. in addition to precipitation and the presence of a gum on the wall of the container | Transparent mixture with a slight haze. There were no oil spots |
| 7–8 | 25° C. | No phase separation occurred. | No phase separation occurred. |
|  | Heating from 25° C. to 100° C. | An oily film formed in addition to a phase separation. | No phase separation occurred. |
| 5–6 | 25° C. | No phase separation occurred | No phase separation occurred |
|  | Heating from 25° C. to 100° C. | An oily film formed in addition to a phase separation | No phase separation occurred |

*Control

Testing of emulsions made from copolymer 2 and a polyglycol ether carboxylic acid/salt (Example 4) yielded similar results. In particular, emulsion stability under alkaline conditions was improved upon incorporation of Emulsogen 080 was incorporated into the emulsion.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
   (a) a polysiloxane copolymer comprising an amino group and a polyether group; and
   (b) a polyglycol ether carboxylic acid/salt of the general formula (5):

$$R^7O(C_2H_4O)_t(CH(CH_3)CH_2O)_qL_kCOOA \qquad (5)$$

wherein A is hydrogen or a cation, $R^7$ is a monovalent hydrocarbon group of about 4 to about 22 carbon atoms, t is 0 to about 20, q is 0 to about 10, L is a divalent hydrocarbon group of 1 to about 6 carbon atoms, and k is 0 or 1, provided that the sum of t and q is greater than or equal to 1.

2. The composition of claim 1, further comprising a carboxylic acid comprising two to about six carbon atoms.

3. The composition of claim 2 wherein the carboxylic acid is glycolic acid, citric acid, itaconic acid, ascorbic acid, or a combination comprising at least one of the foregoing acids.

4. The composition of claim 1 where copolymer (a) and polyglycol ether carboxylic acid/salt (b) is present in a weight ratio of about 99:1 to about 1:20.

5. The composition of claim 1 where copolymer (a) and polyglycol ether carboxylic acid/salt (b) is present in a weight ratio of about 97:3 to about 90:10.

6. The composition of claim 1, further comprising a co-emulsifier.

7. The composition of claim 1 wherein A is a cation of ammonia, an alkaline metal, an alkaline earth metal, a protonated form of an amine having the structure $NH_2R^8$, $NH(R^8)_2$, or $N(R^8)_3$ wherein each $R^8$ is independently hydrogen or a straight or branched chain alkyl group comprising one to about eight carbon atoms, which may be optionally modified with a hydroxyl group, or a mixture comprising at least one of the foregoing cations.

8. The composition of claim 1 wherein the polysiloxane is a linear copolymer comprising:

a polysiloxane unit of general formula (1)

$$-XR^1[(SiO(R^2)_2]_fSi(R^2)_2R^1X-\qquad(1)$$

wherein each $R^1$ is independently a divalent hydrocarbon group of 1 to about 10 carbon atoms, each $R^2$ is independently a phenyl, alkyl, perfluoroalkyl group of 1 about 6 carbon atoms, f is an integer of 1 to about 500, and X is a divalent organic linking group derived from the ring opening of an epoxide;

a polyalkyleneoxide unit of the general formula (2)

$$-YO(C_dH_{2d}O)_eY-\qquad(2)$$

wherein each Y is independently a divalent organic linking group derived form the ring opening of an epoxide, d is 2 to about 4, and e is 2 to about 100; and a linking group, wherein the linking group is $-NR^3-$, $(-NHR^3-)^+(P^-)$ or $(-NR^3_2-)^+(P^-)$, wherein $R^3$ is an alkyl, aryl or aralkyl group, each of 1 to about 20 carbon atoms, and wherein each $R^3$ may optionally also comprise an oxygen atom, and P is an anion.

9. The composition of claim 1 wherein the polysiloxane is of the general formula (3):

$$RSiR^2_2O[Si(R^2_2)O]_x[Si(R^2)(Z)O]_ySiR^2_2R\qquad(3)$$

wherein each $R^2$ is independently phenyl, an alkyl, or perfluoroalkyl group of 1 to about 6 carbon atoms;

x is 1 to about 500;

y is 1 to about 50;

each R is independently an alkyl group of 1 to about 4 carbon atoms or Z, wherein each Z is independently a group of the general formula (4)

$$-BO(C_dH_{2d}O)_mG\qquad(4)$$

wherein d is 2 to about 4, m about 3 to about 100,

B is an alkylene group of about 2 to about 4 carbon atoms, and

G is a hydrogen atom or a lower alkyl group of 1 to about 4 carbon atoms, or each Z is independently D, which is an amino group of the formula $-R^4M$, $-R^4N(R^5)_2$, or $-R^4N(R^5)-R^6-N(R^5)_2$, wherein $R^4$ is an alkylene group of 1 to about 10 carbon atoms optionally containing a hydroxy group and/or an ether linkage, M is a heterocyclic amine comprising about 4 to about 6 carbon atoms, optionally with one oxygen atom in the ring, and optionally substituted with a $C_{1-2}$ alkyl group or a $C_{1-4}$ alkoxy group, each $R^5$ is independently a hydrogen atom, an alkyl group of 1 to about 6 carbon atoms, a hydroxyalkyl group of 1 to about 6 carbon atoms, or $-R^4M$ as defined above, and each $R^6$ is independently an alkylene group of 1 to about 6 carbon atoms, optionally containing a hydroxy group and/or an ether linkage, and wherein in formula (3) at least one Z is a polyether and at least one Z comprises an amino group.

10. The composition of claim 1 wherein the composition is in the form of a concentrate.

11. The composition of claim 1 where the composition is in the form of an emulsion.

12. The composition of claim 11 where the emulsion is a microemulsion or macroemulsion.

13. A method comprising contacting a textile with an treatment composition comprising:

(a) a polysiloxane copolymer comprising an amino group and a polyether group;

(b) a polyglycol ether carboxylic acid/salt of the general formula (5):

$$R^7O(C_2H_4O)_t(CH(CH_3)CH_2O)_qL_k(CH_2)_kCOOA\qquad(5)$$

wherein A is hydrogen or a cation, $R^7$ a monovalent hydrocarbon group of about 4 to about 22 carbon atoms, t is 0 to about 20, q is 0 to about 10, L is a divalent hydrocarbon group of 1 to about 6 carbon atoms and k is 0 to about 6, provided that the sum of t and q is greater than or equal to 1.

14. The method of claim 13 where the copolymer (a) and polyglycol ether carboxylate acid/salt (b) is present in a weight ratio of about 99:1 to about 1:20.

15. The method of claim 13 wherein A is a cation of ammonia, an alkaline metal, an alkaline earth metal, a protonated form of an amine having the structure $NH_2R^8$, $NH(R^8)_2$, or $N(R^8)_3$ wherein each $R^8$ is independently hydrogen or a straight or branched chain alkyl group comprising one to about eight carbon atoms, which may be optionally modified with a hydroxyl group, or a combination comprising at least one of the foregoing cations.

16. The method of claim 13 where the composition is present in the form of an aqueous emulsion.

17. The method of claim 16 wherein during treating the textile, the pH of the aqueous emulsion is about 2 to about 12.

18. The method of claim 16 comprising treating the textile in an alkaline environment.

19. The method of treating a textile of claim 13 comprising treating the textile at a temperature between ambient temperature and about 100° C.

20. The method of claim 19 wherein the temperature is up to about 80° C.

21. A textile that has been treated with the composition of claim 1.

22. A textile treated by the method of claim 13.

* * * * *